United States Patent
Kalla

(10) Patent No.: US 9,226,234 B2
(45) Date of Patent: Dec. 29, 2015

(54) SYSTEMS, METHODS, AND APPARATUS FOR REDUCING MOBILE DEVICE POWER CONSUMPTION RELATIVE TO PERIODIC DATA PACKET TRANSFERS

(75) Inventor: Naveen Kalla, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 486 days.

(21) Appl. No.: 13/476,303

(22) Filed: May 21, 2012

(65) Prior Publication Data

US 2013/0308690 A1    Nov. 21, 2013

(51) Int. Cl.
*H04J 3/04*     (2006.01)
*H04W 52/02*    (2009.01)

(52) U.S. Cl.
CPC ............ *H04W 52/0216* (2013.01); *Y02B 60/50* (2013.01)

(58) Field of Classification Search
None
See application file for complete search history.

(56) References Cited

U.S. PATENT DOCUMENTS 7,957,352 B2 * 6/2011 Vanghi et al. ................. 370/335
8,674,808 B2 * 3/2014 Jantunen et al. ............. 340/10.3
2004/0073940 A1 * 4/2004 Chen et al. ..................... 725/111
2005/0073977 A1 * 4/2005 Vanghi et al. ................. 370/335
2007/0177617 A1 * 8/2007 Noh et al. ..................... 370/401
2009/0219904 A1 * 9/2009 Khairmode et al. .......... 370/338
2012/0027059 A1 * 2/2012 Zhao et al. .................... 375/222

OTHER PUBLICATIONS

White paper: Seven Open Channel—Network to Device Optimization, Feb. 2011, p. 15 Publisher: Seven.

* cited by examiner

*Primary Examiner* — Willie J Daniel, Jr.
(74) *Attorney, Agent, or Firm* — Neugeboren O'Dowd PC

(57) ABSTRACT

This disclosure describes systems, methods, and apparatus for aligning data packet transmission calls to a modem processor 304, 306, 308 of a mobile communication device 300 in order to enable the modem processor 304, 306, 308 to remain in a dormant state for a greater percentage of time. Alignment can be carried out via a function of a library at the applications layer or via an automated method carried out at the network protocol stack where modification of applications via an API provided by the library is not required. For alignment at the applications layer, calls for data packet transmissions can be timed such that periodic calls occur at substantially the same time. For alignment at the network protocol stack, periodic data packet transmission calls can be identified, their periodicity determined, and certain of the calls can be delayed such that periodic calls occur substantially at the same time.

23 Claims, 9 Drawing Sheets

SYSTEMS, METHODS, AND APPARATUS FOR REDUCING MOBILE DEVICE POWER CONSUMPTION RELATIVE TO PERIODIC DATA PACKET TRANSFERS

BACKGROUND

1. Field

The present disclosure relates generally to communication devices. More particularly it relates to mobile wireless communication devices.

2. Background

In a smartphone, tablet, or other mobile communications device, a modem processor is typically operated in a dormant, rather than active, state as often as possible and for as long as possible in order to conserve power. However, when an application calls for network traffic, the modem processor is returned to an active state. Every time the modem processor returns to an active state, a fixed time is allowed to pass before returning to dormancy to ensure that other calls for the modem processor are not delayed if the modem processor goes dormant at or near the same time that another modem processor call is made.

However, this delay time is not always necessary and thus the modem processor sometimes remains in an active state even when there is no network traffic. This problem is even more troubling most acute when a second modem processor call is made before the fixed delay time of a first active modem processor state ends, thus leaving the modem processor in an active state for an extended period of time. Where modem processor calls are made frequently, the modem processor may not enter dormant mode for long stretches of time, even where the network traffic only involves small packets. In such cases, the modem processor remains in an active state almost continually despite very little actual network traffic.

SUMMARY

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Some embodiments of the disclosure may be characterized as a communication device comprising a modem processor and an application processor. The modem processor can be configured to receive modem processor calls and to transmit corresponding data packets to another device. The application processor can include a first application, a second application, and a scheduling module. The first application can be configured to make at least a first modem processor call to the modem processor. The second application can be configured to make at least a second modem processor call to the modem processor subsequent to the first modem processor call. The scheduling module can be configured to delay the first modem processor call such that it aligns with the second modem processor call.

Other embodiments of the disclosure may also be characterized as a communication device comprising: a means for receiving modem processor calls; a modem processor configured for transmitting corresponding data packets to another device; a means for making at least a first modem processor call to the modem processor; a means for making at least a second modem processor call to the modem processor subsequent to the first modem processor call; and a means for aligning the first and second modem processor calls.

Other embodiments of the disclosure can be characterized as a method of operating a communication device. The method can include identifying applications that periodically make modem processor calls as identified applications. The method can further include determining periodicities of modem processor calls made by the identified applications. The method can also include scheduling at least a next two of the modem processor calls from the identified applications to occur at substantially the same time based on the determined periodicities. The method can additionally include transmitting data packets corresponding to the next two modem processor calls at substantially the same time.

Still further embodiments of the disclosure can be characterized as a non-transitory, tangible computer readable storage medium, encoded with processor readable instructions to perform a method for operating a communication device. The method can include receiving modem processor calls at a modem processor. The method can further include transmitting data packets corresponding to the modem processor calls to another device. The method can also include making at least a first modem processor call to the modem processor via an application operating on an application processor. The method can additionally include making at least a second modem processor call to the modem processor subsequent to the first modem processor call via a second application operating on the application processor. The method can yet further include aligning the first and second modem processor calls via a function of a library.

DETAILED DESCRIPTION

To enable the modem processor to enter a dormant state more often and remain there for longer, systems, methods, and apparatus are herein disclosed for scheduling periodic data packet transmissions (or calls to a modem processor for said data packet transmissions) to take place at or substantially at the same time. Examples of periodic data packet transmissions or requests from remote servers include stock quote tracking application updates, social media updates, and e-mail clients periodically checking for new messages, to name three. The process of achieving this goal can be referred to as aligning data packet transmissions. Data packet transmission can include outgoing traffic such as uploads to a host or requests for downloads from a host. The timing of data packet transmission requests can be varied at the applications layer such that periodic requests are made at or near the same time (or according to a least common multiple where the periods of two periodic requests are not the same). For instance, by adjusting the firing of timers for two or more applications such that they fire coincidentally. More particularly, this may involve providing an API enabling application developers to create functionality in a library enabling their applications to have timers that fire coincidentally with timers of other applications. In this way, the modem processor is allowed to enter a dormant state more often and for longer periods of times than would with possible without the alignment of data packet transmissions.

Alternatively, an automated process can take place at the network protocol stack that operates without the need for application developer modification of applications. In the automated embodiment, periodic data streams can be identified, their periods determined, and delays can be applied to the periodic data streams such that they align or are received at a modem processor at the same time.

The word "exemplary" is used herein to mean "serving as an example, instance, or illustration." Any embodiment described herein as "exemplary" is not necessarily to be construed as preferred or advantageous over other embodiments.

Figure 1:
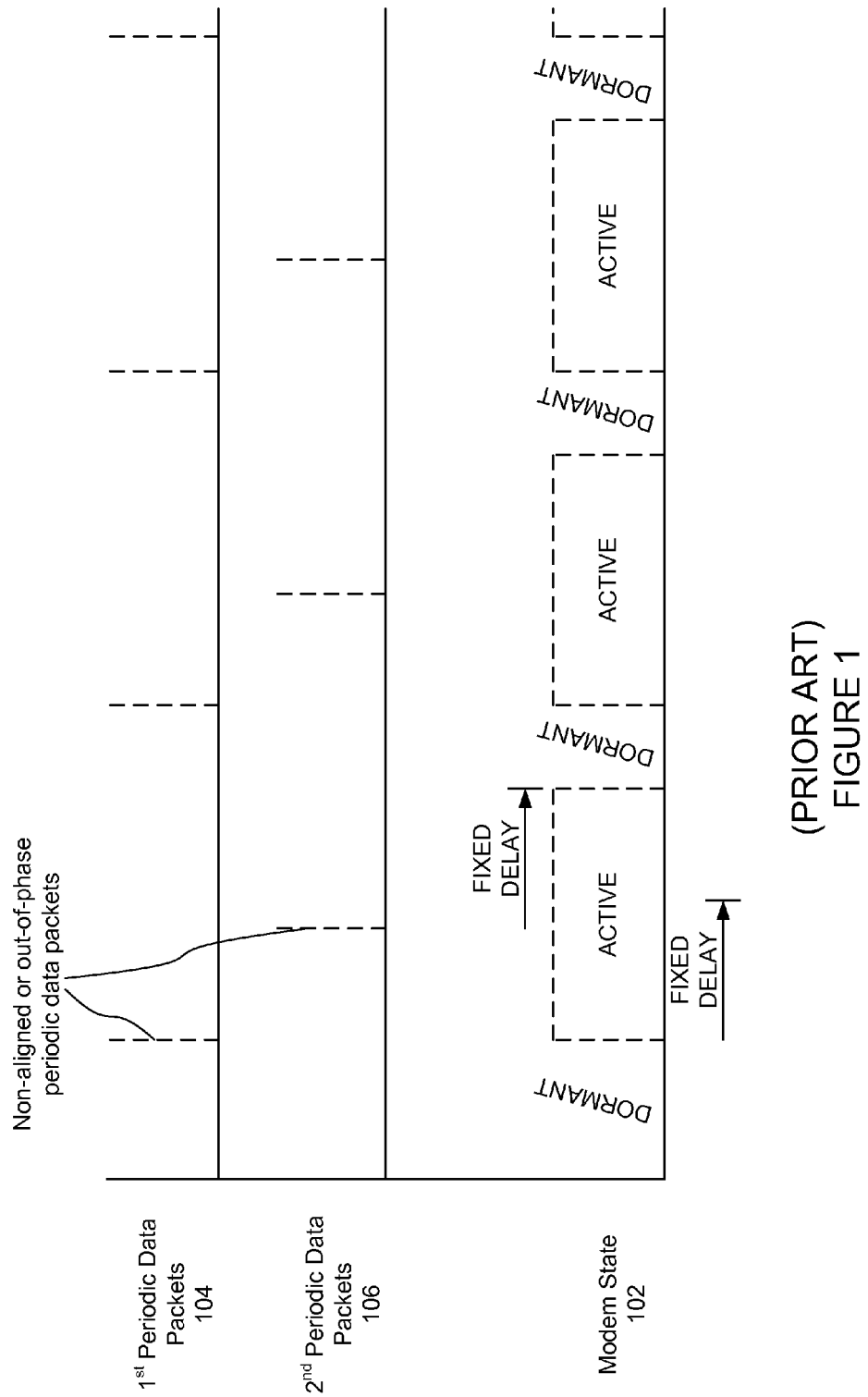
FIG. 1 illustrates a timing diagram of a modem processor state without phasing or alignment of a first and second stream of periodic data packets.
Figure 2:
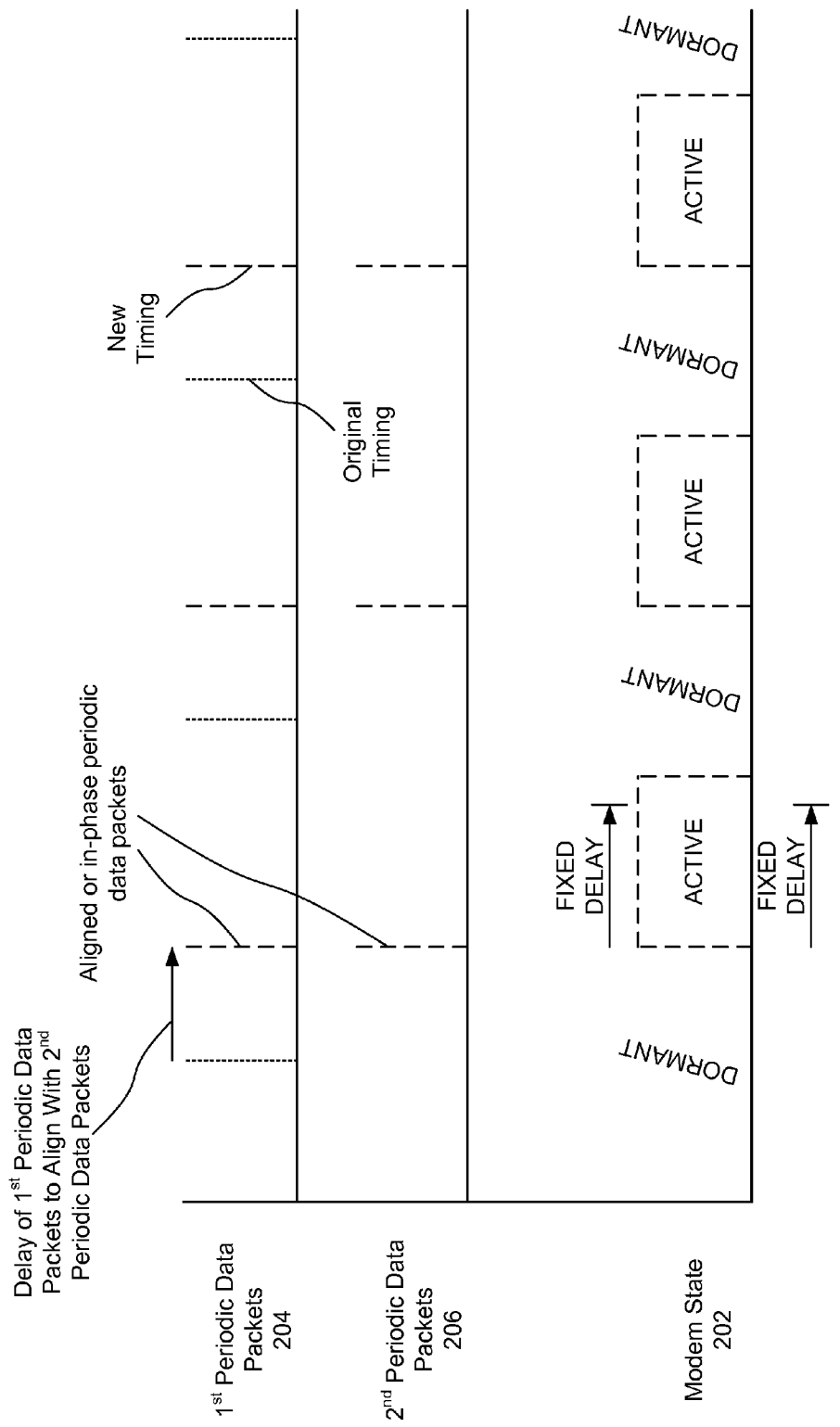
FIG. 2 illustrates a timing diagram of a modem processor state with phasing or alignment between a first and second stream of periodic data packets.

FIG. 1 illustrates a timing diagram of a modem processor state 102 without phasing or alignment of a first and second stream of periodic data packets 104, 106 and FIG. 2 illustrates a timing diagram of a modem processor state 202 with phasing or alignment between a first and second stream of periodic data packets 204, 206. As seen, when calls to the two modem processors to transmit data packets are made without being aligned (FIG. 1), the overlapping fixed delays associated with the transmission of data packets force the modem processor to remain in an active state longer than when the calls to the modem processor are aligned (FIG. 2). This is because every time the modem processor is activated or brought out of dormancy, the modem processor remains active for a fixed delay in order to ensure that it does not go dormant before another process requests the modem processor. Often this fixed delay occurs despite there being no subsequent usage of the modem processor and thus large portions of time see the modem processor in an active state despite there being no use of the modem processor.

To minimize the power used when the fixed delays run, the timing of data packet transmissions can be aligned so that the modem processor is awakened at the same time for multiple data packets from different applications. This alignment may also be referred to as phasing. When multiple data packets are transmitted at the same time, such as in FIG. 2, the fixed delay periods associated with each call to the modem processor overlap to a greater extent than in FIG. 1 and the total time that the modem processor remains in the active state is reduced. Thus, the alignment shown in FIG. 2 allows the modem processor to remain dormant for longer periods of time than the non-aligned timing of FIG. 1.

Aligning calls to the modem processor for data packet transmissions can be performed by delaying one or more calls or forcing them to be made earlier than scheduled. FIG. 2 illustrates an embodiment of two sets of periodic data packet transmissions where the first stream of periodic data packets 204 are delayed in order that modem calls for transmission of the first stream of periodic data packets 204 reach the modem processor at the same time as calls for transmission of a second stream of periodic data packets 206. In other embodiments, the second stream of periodic data packets 206 could have been transmitted earlier in order to align with the original timing of the first stream of periodic data packets 204. This alignment can also be applied to three or more streams of periodic data packets.

In some embodiments, once a call for transmission of a data packet is aligned with another call, subsequent modem processor calls will inherently also be aligned according to some periodicity. For instance, where a first modem processor call has a period of 5 seconds and a second modem processor call has a period of 10 seconds, and the these two streams of modem processor calls are aligned, subsequent calls and their respective transmissions of data packets will be aligned every 10 seconds (a least common multiple of the two periods). Similarly, if the first modem processor call has a period of 3 seconds and the second modem processor call has a period of 5 seconds, then the first and second modem processor calls will be aligned every 15 seconds.

There are two primary methods that can be used to align modem processor calls: one at the application layer of a software stack and one at the network protocol stack. At the application layer an API can be provided enabling application developers to add to, modify, or create a library to provide functionality that aligns modem processor calls for transmission of data packets for multiple applications. In this way, when two or more applications using the API make calls to the modem processor to transmit data packets, one or more timers associated with each of the calls can be sped up or delayed (in terms of firing time, but where the period of firing remains the same) so that the timers fire at the same time. Subsequent firings of the timers may not be aligned if the periods of the calls are not the same, but for periodic modem processor calls, the timer firings will eventually align again according to a period equal to a least common multiple of the periods of the various modem processor calls.

At the network protocol stack alignment can be automated such that the application developer need not take action to ensure alignment. Instead, a scheduling module of the network protocol stack can identify applications that make periodic modem processor calls and identify the periodicity of those calls. The scheduling module can then delay calls from one or more applications by one or more delay times such that the calls reach the modem processor at the same time.

For the purposes of this disclosure, alignment of modem processor calls will be described in terms of "simultaneous" or "aligned" or "in phase" as illustrated in FIG. 2. However, one of skill in the art will recognize that modem processor calls may not be able to be made simultaneously and thus a slight offset between "aligned" modem processor calls may be used such that aligned modem processor calls reach the modem processor sequentially rather than at the same time. This offset is well understood to those of skill in the art and of such a small time value that it will not be referenced or illustrated in this disclosure.

Figure 3:
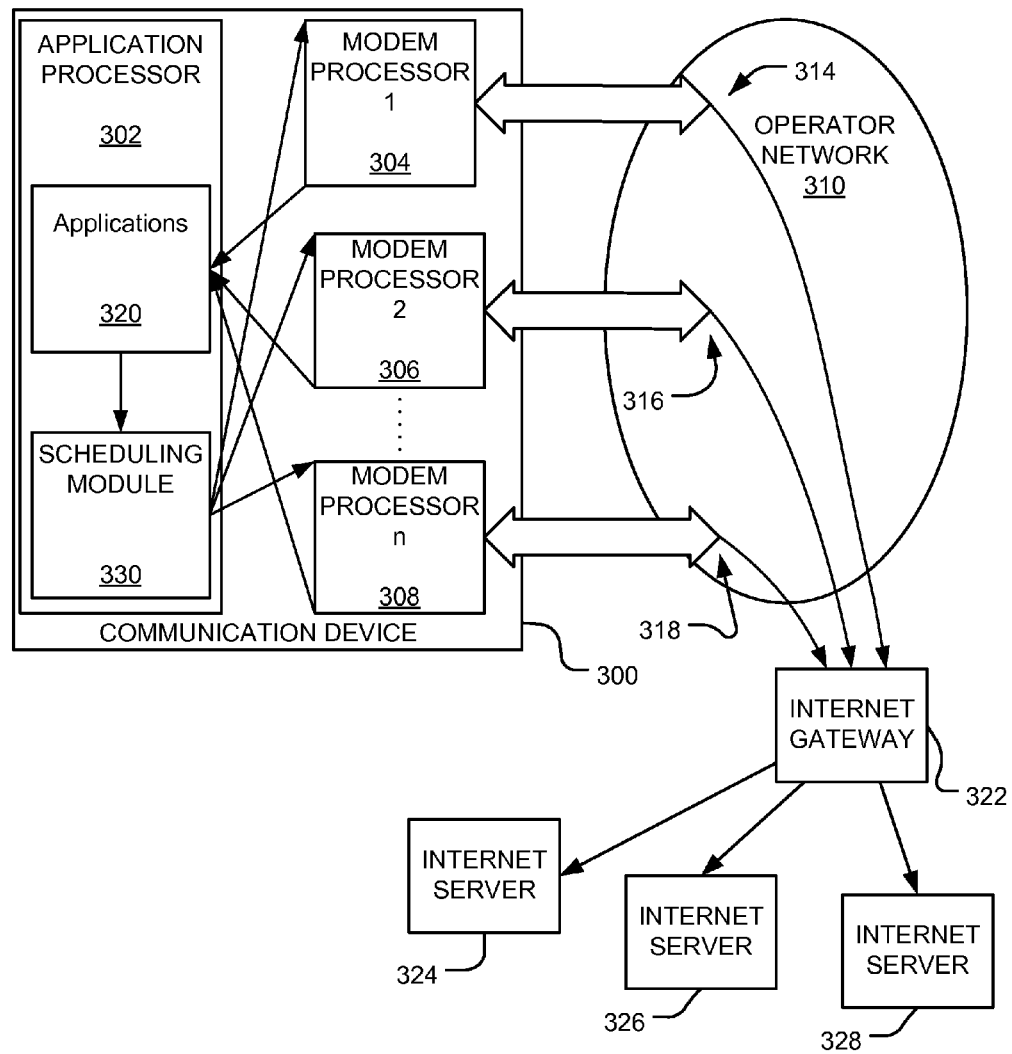
FIG. 3 shows a high-level system diagram of a communication device transmitting and receiving data packets from and to one or more applications via one or more modem processors.

FIG. 3 shows a high-level system diagram of a communication device 300 transmitting and receiving data packets from and to one or more applications 320 via one or more modem processors 304, 306, and 308. Communication device 300 includes application processor 302 in communication with multiple modem processors 304, 306, and 308.

The application processor 302 passes calls from the one or more applications 320 to the one or more modem processors 304, 306, 308 requesting transmission of data packets. These calls can be analyzed by a scheduling module 330 that identifies applications of the one or more applications 320 making periodic modem processor calls and further determines the period of these periodic modem processor calls. The scheduling module 330 can then determine by how much to delay certain of the periodic modem processor calls such that they reach a given modem processor 304, 306, 308 at the same time. By aligning periodic modem processor calls from different ones of the one or more applications 320 to the same modem processor, the scheduling module 330 reduces an amount of time that each modem processor 304, 306, 308 spends in an active state.

Each modem processor 304, 306, 308 receives the calls and sends the corresponding data packets over a radio frequency (RF) link to corresponding nodes 314, 316, 318 in an operator network 310 (e.g., a cellular network, an Internet network, or a combination of the two). As depicted, modem processor 304 transmits its data packets to node 314 (e.g., a cell, WIFI Hotspot, or Ethernet-based Internet access point, to name a few) in the operator network 310. Similarly, modem processors 306 and 308 transmit their data packets to nodes 316 and 318, respectively, in the operator network 310. The operator network 310 passes the data packets to an Internet gateway 322, which then passes the data packets to one or more Internet servers 324, 326 or 328 called by the one or more applications 320 in the communication device 300.

When any of the Internet servers 324, 326 and 328 reply to one of the one or more applications 320 in the communication device 300, the responding server sends back data, via the Internet gateway 322. Data packets travel via nodes 314, 316 and 318 back to modem processors 304, 306 and 308, respectively. The application processor 302 passes these returning data packets to a TCP/IP stack (not shown), which then forwards the data packets to the respective applications in the communication device 300.

Although three modem processors 304, 306, 308 are shown in FIG. 3, any number of modem processors 304, 306, 308 might be placed in communication device 300 as represented by the variable "N" for the number of modem processors 308. Each modem processor 304, 306, 308 can communicate via a different protocol, such as BLUETOOTH, WWAN (4G), and WIFI (3G), to name three non-limiting examples. The communication device 300 may be any one of a variety of devices that communicate wirelessly. For example, the communication device 300 may be realized as a smartphone, netbook, ultrabook, gaming device, PDA, tablet, or a laptop computer.

Figure 4:
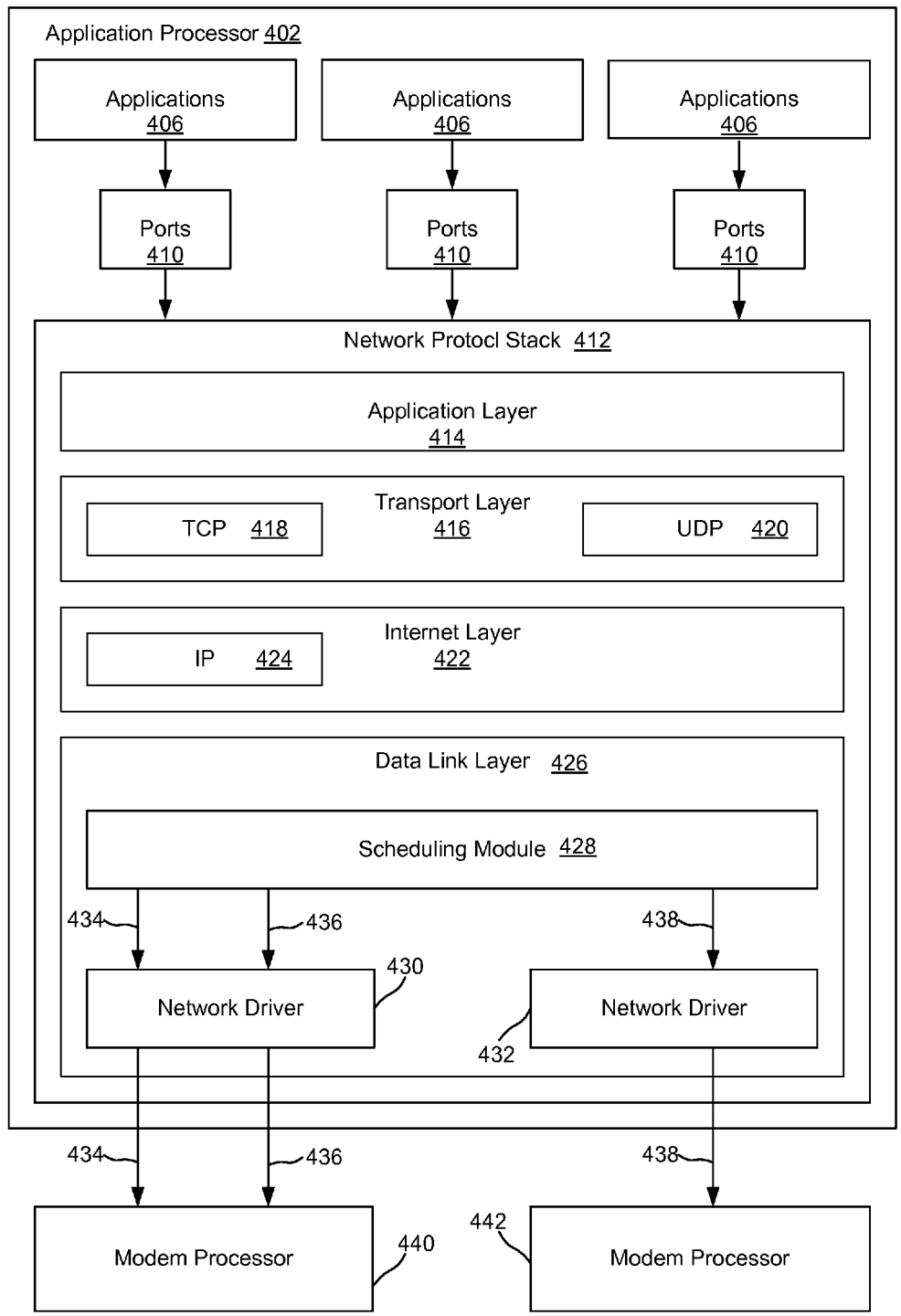
FIG. 4 illustrates one embodiment of a system in which alignment of calls to modem processors to transmit data packets can be implemented at a network protocol stack.

FIG. 4 illustrates one embodiment of a system in which alignment of calls to modem processors to transmit data packets can be implemented at a network protocol stack. One or more applications 406 can run on an application processor 402. Each of the applications 406 can request transmission of data packets by sending data packets to a corresponding one of the ports 410, where the ports 410 pass data packets to network drivers 430, 432 via a network protocol stack 412. The network protocol stack 412 includes an application layer 414, a transport layer 416, an Internet layer 422, and a data link layer 426. The data packets pass through the transport layer 416 via either a transmission control protocol (TCP) 418 or a user datagram protocol (UDP) 420. The Internet layer 422 can include an Internet Protocol (IP) 424. Packets are analyzed and scheduled for transmission in the data link layer 426 by a scheduling module 428 and are then allowed to reach one or more network drivers 430, 432, also in the data link layer 426.

The network drivers 430, 432 are configured to interface software with hardware. The scheduling module 428 can schedule an arrival of periodic data packets (e.g., 434, 436) at one or more of the network drivers 430, 432 (e.g., 430). Non-periodic data packets (e.g., 438) can be allowed to reach their respective modem processor (e.g., 432) in a non-aligned fashion. For instance, in the illustrated embodiment, the scheduling module 428 can identify a first and second stream of data packets 434, 436 as periodic (e.g., a stock ticker and a social media update) while a third stream of data packets 438 is not deemed periodic (e.g., a user's selection of a web browser function). The scheduling module 428 can schedule a first data packet from the first stream of data packets 434 and a second data packet from the second stream of data packets 436 such that they are in phase or aligned. Some or all subsequent data packets from both streams of data packets 434, 436 will thus also be aligned (e.g., the aligned data packets will be those having a period equal to a least common multiple of the periods of both streams of data packets 434, 436). This phasing or alignment can involve delaying one of the first and second streams of data packets 434, 436 before they are passed by the network driver 430, but this is not required.

To illustrate this idea, a first modem processor call can be scheduled to fire every two minutes starting with 2:00:15 (2:00:15, 2:02:15, 2:04:15, 2:06:15, etc) and a second modem processor call can be scheduled to fire every three minutes starting with 2:00:45 (2:00:45, 2:03:45, 2:06:45, 2:09:45, etc.). The scheduling module 428 can identify both of these streams of calls as periodic and determine that the first period is two minutes and the second one is three minutes. The scheduling module 428 can then determine a delay to apply to the first modem processor calls such that at least some of them occur at the same time as the second modem processor calls. For instance, the first modem processor calls can be delayed by thirty milliseconds, thus firing coincidentally with the second modem processor calls at 2:00:45, 2:06:45, and every subsequent six minutes (a least common multiple of the period of the first and second modem processor calls).

In some embodiments, a period and accuracy can be parameters associated with each of the applications 406, that the scheduling module 428 can use these parameters to align modem processor calls. The period dictates how often one of the application 406 makes calls to one of the modem processors for transmission of data packets. The accuracy indicates by how much the timing of such calls can be modified (e.g., delayed, but with no change to the period). For instance, where the modem processor calls from a first and second application are scheduled to be made at 2:00:15 and 2:00:40 (25 seconds apart), and an accuracy associated with two applications making these calls is 30 seconds, then the scheduling of the modem processor calls can be modified such that they take place at 2:00:40. However, if the accuracy associated with the two applications is 10 seconds, then the scheduling of the modem processor calls cannot be modified since the required delay is greater than the accuracy associated with the first application.

In some cases, different applications can be associated with different accuracies. For instance, the first application can be associated with an accuracy of 10 seconds, and the second application can be associated with an accuracy of 20 seconds. In some cases, an application may be associated with an accuracy of 0, and its schedule will never be delayed. Alternatively, a period and accuracy may simply not be associated with such an application, and as a result alignment procedures will not modify a schedule of said application (this may be desirable where a user experience of an application could be degraded if even a slight change in the data packet transmission schedule were to take place such as with VOIP).

The scheduling module 428 can assign an accuracy to each modem processor call, where the accuracy can be the same or unique for modem processor calls from different applications. For instance, the scheduling module can assign a 10, 50, or 100 millisecond accuracy to all modem processor calls.

The first and second streams of data packets 434, 436, now aligned or in phase, reach the first network driver 430 and are passed to a first modem processor 440 for transmission. Because the first and second streams of data packets 434, 436 are aligned, the first modem processor 440 wakes from a dormant state for a shorter period of time than if the first and second streams of data packets 434, 436 were not aligned (recall FIG. 2).

In one embodiment, the scheduling module 428 can look to a port number of one of the ports 410 from which a data packet is sourced from to determine what type of application sent the data packet. It may be desirable to not perform alignment on certain applications where modifications to the phase of periodic data packets could degrade a user experience. For instance, for VOIP, delaying data packets by even a small time can lead to jitter in the voice signal and thus alignment could cause degradation of the user experience. The scheduling module 428 can be configured to recognize data packets from VOIP applications and others where alignment procedures are to be avoided, and not perform alignment for these data packets.

In some instances, the scheduling module 428 can identify data packets that are sourced from applications where alignment could degrade a user experience, but alignment may still be carried out where the delay is below a threshold time associated with the application. For instance, a first delay threshold can be associated with VOIP applications while a second delay threshold is associated with online gaming applications. Even where such delay thresholds are in place for some applications, some other applications may be so sensitive to changes in the timing of data packet transmissions that they always forgo the alignment process.

The first network driver 430 can operate according to a first network protocol (e.g., WIFI, HSPA+, LTE, WiMAX, GSM, EDGE, UMTS, 3GPP, etc.) while the second network driver 432 can operate according to a second network protocol. Similarly, the first and second modem processors 440, 442 can operate according to different network protocols.

While the scheduling module 428 is illustrated as existing in the data link layer 426, this is just one of various stack locations where the scheduling module 428 can be implemented. For instance, in other embodiments, the scheduling module 428 can be arranged as part of one or both of the network drivers 430, 432. For instance, the scheduling module 428 can be arranged as part of the first network driver 430, which may be responsible for interfacing with a first modem processor 440 for communicating via cellular means, and the scheduling module 428. In other embodiments, the scheduling module 428 can be arranged elsewhere in the network protocol stack 412, for instance, as part of the transport layer 416, part of the Internet layer 422, or in between any of these. Since application developers decide whether an application will utilize the TCP 418 or the UDP 420, but typically not both, the scheduling module 428 preferably resides below the transport layer 416 so as to monitor data packets arriving via both the TCP 418 and the UDP 420. In some embodiments, the scheduling module 428 can be arranged in the modem processors 440, 442, however this may not be preferred since alignment is desirable before the data packets reach the modem processors 440, 442.

One of skill in the art will recognize that the systems illustrated in FIGS. 3-4 are not limited to any particular hardware or software platform. For instance, they can be implemented on ANDROID or IOS, to name two non-limiting software examples. They can also be implemented in smartphones or tablet computers, to name two non-limiting hardware examples.

Figure 9:
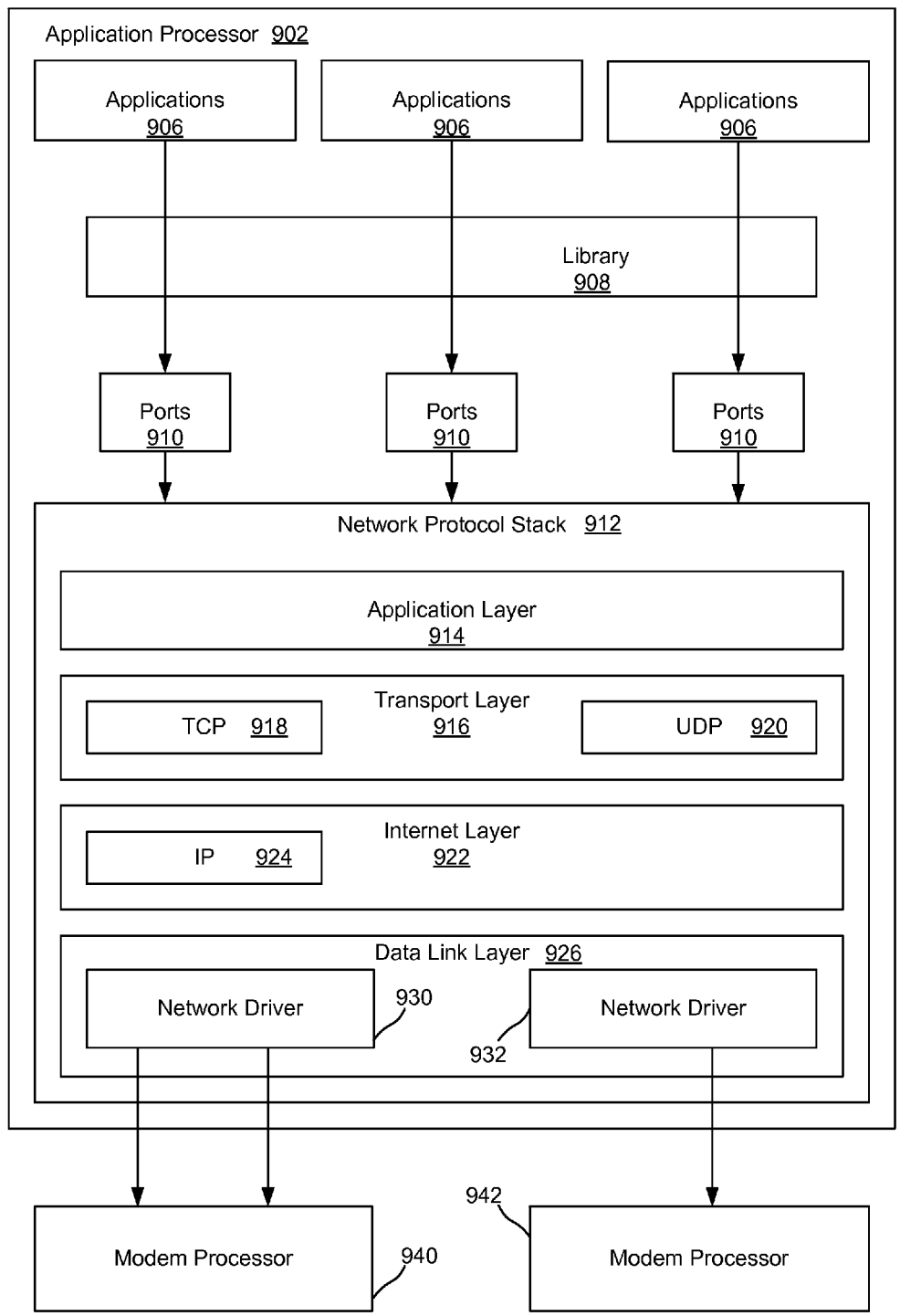
FIG. 9. illustrates one embodiment of a system in which alignment of calls to modem processors to transmit data packets can be implemented at an application layer.

FIG. 9 illustrates one embodiment of a system in which alignment of calls to modem processors to transmit data packets can be implemented at an application layer. One or more applications 906 can run on an application processor 902. Each of the one or more applications 906 can request transmission of data packets by sending data packets to a corresponding one of the ports 910 as modem processor calls. The ports 910 pass the modem processor calls to network drivers 930, 932 via a network protocol stack 912. The network protocol stack 912 includes an application layer 914, a transport layer 916, an Internet layer 922, and a data link layer 926. The modem processor calls pass through the transport layer 916 via either a transmission control protocol (TCP) 918 or a user datagram protocol (UDP) 920. The Internet layer 922 can include an Internet Protocol (IP) 924.

A library 908 of the operating system can have functions enabling two or more of the applications 906 to align the modem processor calls that they make. In one embodiment, an API can be provided that enables application developers to add functions to, modify functions of, or create the library 908. A function of the library 908 monitors scheduling of modem processor calls from the one or more applications 906. It can look for modem processor calls from different ones of the applications 906 scheduled to be made near the same time (e.g., within 10 milliseconds or within 30 seconds). The library 908 function can modify when those calls are made such that they occur at the same time. For instance, modem processor calls can be sped up or delayed at the application layer in order to align and thus call the modem processors 940, 942 at the same time. More often, a subsequent modem processor call will be scheduled to occur earlier than scheduled in order to align with an earlier call.

To illustrate this idea, a first modem processor call can be scheduled to fire every two minutes starting with 2:00:15 (2:00:15, 2:02:15, 2:04:15, 2:06:15, etc) and a second modem processor call can be scheduled to fire every three minutes starting with 2:00:45 (2:00:45, 2:03:45, 2:06:45, 2:09:45, etc.). The function of the library 908 can force the first modem processor call to be called later than scheduled, for instance at 2:00:30, and the second modem processor call to be called earlier than scheduled, for instance also at 2:00:30. This change shifts the schedule of both modem processor calls such that the first modem processor calls are made at 2:00:30, 2:02:30, 2:04:30, 2:06:30, 2:08:30, etc., and the second modem processor calls are made at 2:00:30, 2:03:30, 2:06:30, 2:09:30, etc. As seen, the first and second modem calls will again occur simultaneously at 2:06:30, and continue to be called at the same time every X minutes, where X is a least common multiple of the periods of the first and second modem processor calls (e.g., 6 minutes).

In some embodiments, a period and accuracy can be parameters associated with each of the applications 906, such that the library 908 function can use these parameters to align modem processor calls. The period dictates how often one of the applications 906 makes calls to one of the modem processors for transmission of data packets. The accuracy indicates by how much the timing of such calls can be modified (e.g., sped up or delayed, but with no change to the period). For instance, where the modem processor calls from a first and second application are scheduled to be made at 2:00:15 and 2:00:40 (25 seconds apart), and an accuracy associated with two applications making these calls is 30 seconds, then the scheduling of the modem processor calls can be modified such that they take place at the same time (e.g., at any time between 2:0015 and 2:00:40, or if the accuracy is great enough they could even be scheduled outside this range, for instance at 2:00:50 if the accuracy of the first application was at least 35 seconds). However, if the accuracy associated with the two applications is 10 seconds, then the scheduling of the modem processor calls cannot be modified such that the modem processor calls are coextensive.

In some cases, different applications can be associated with different accuracies. For instance, the first application can be associated with an accuracy of 10 seconds, and the second application can be associated with an accuracy of 20 seconds. In this case, and assuming the first modem processor calls of both applications are scheduled to be made at 2:00:15 and 2:00:45, both modem processor calls could be scheduled to take place at 2:00:25. In some cases, an application may be associated with an accuracy of 0, and its schedule will never be shifted. Alternatively, a period and accuracy may simply not be associated with such an application, and as a result alignment procedures will not affect such an application (this may be desirable where a user experience of an application could be degraded if even a slight change in the data packet transmission schedule were to take place such as with VOIP).

The scheduling of modem processor calls can be associated with timers of each one of the applications 906, where the extinction or firing of a timer triggers a modem processor call to be made. After each call, the timer can be reset and begins ticking down towards the next modem processor call. In some instances, timers can be scheduled via link lists, where a link list is a data structure consisting of groups of nodes which together represent a sequence. Each node can comprise a datum and a reference or link to the next node in the sequence. The first node can point to a first timer to fire, and a second node can point to a subsequent timer to fire. The timers can be scheduled in a link list such that they fire in time. In particular, the library 908 function can monitor a link list and when a first timer is set to fire, the function of the library 908 can look for a second timer in the link list where the difference between the first timer and the second timer is less than a sum of the accuracies associated with the first and second timers (in other words, can either or both timers be rescheduled such that they occur at the same time). If so, then the library 908 function can modify the scheduled firing time of either or both of the timers such that they fire at the same time. This phase change to the schedule of either or both timers will then propagate to each subsequent firing of both timers such that they periodically fire at the same time (but also at different times if the periods of both are not equal).

While the library 908 and its function(s) have been described as being responsible for scheduling the modem processor calls from the applications 906 and for aligning the calls (or managing a link list), in other embodiments, an operating system (OS), services (e.g., ANDROID or LINUX services), shared libraries (non-core libraries), or a combination of these, can manage the scheduling and alignment of modem processor calls (or manage the link list).

Figure 5:
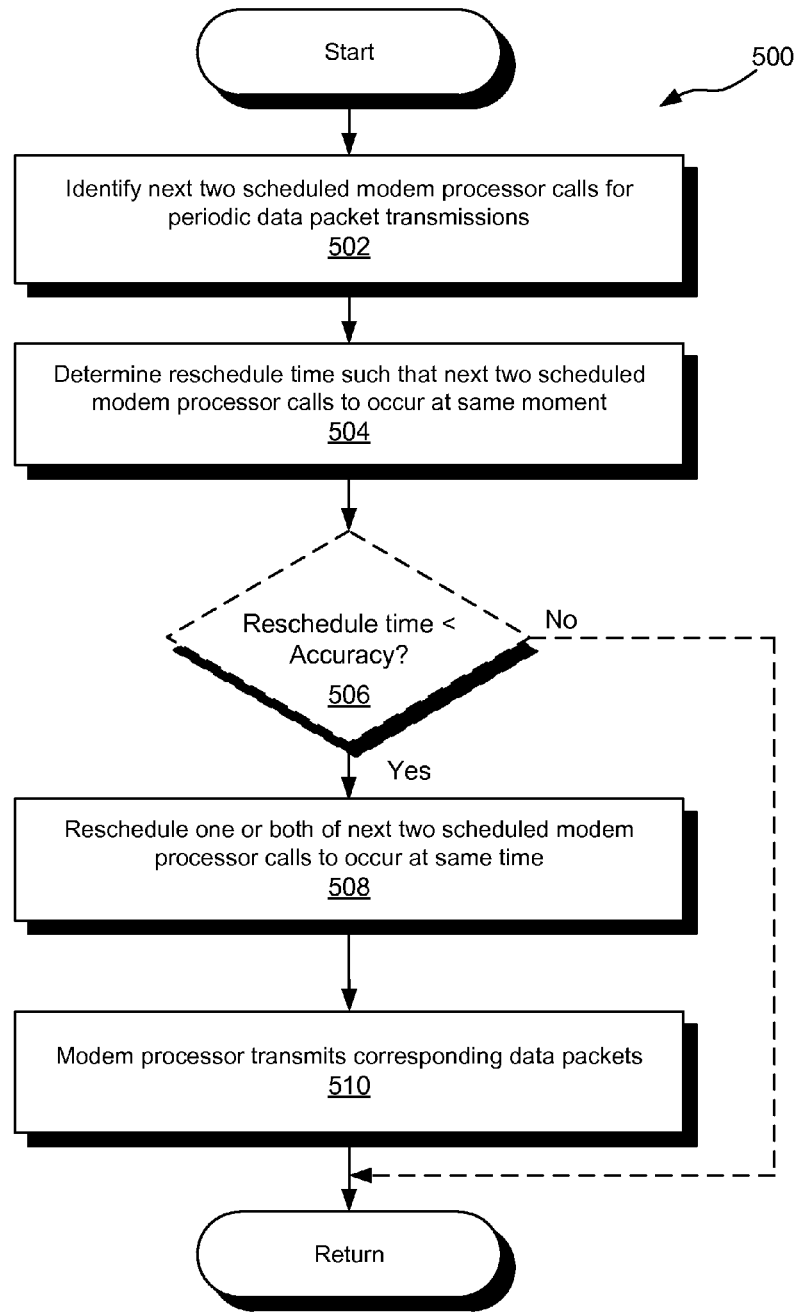
FIG. 5 illustrates one embodiment of a method for aligning periodic modem processor calls at the applications layer.

FIG. 5 illustrates one embodiment of a method 500 for aligning periodic modem processor calls at the applications layer. In the method 500 two or more applications (e.g., applications 320 in FIG. 3, applications 406 in FIG. 4, applications 906 in FIG. 9) make calls to the modem processor to transmit data packets. Some of these transmissions may be periodic. When they are, a function of a library (e.g., library 908) can monitor a schedule of modem processor calls from the applications requesting periodic data packet transmissions. In an identification operation 502, a next two scheduled modem processor calls can be identified. A reschedule time can be determined for one or both of the next two scheduled modem processor calls in a determine reschedule time operation 504. The reschedule time can be an earlier or later time that either or both of the next two scheduled modem processor calls can be rescheduled by (e.g., 10 seconds earlier, 35 seconds earlier, 15 seconds later, etc.).

Before the calls are made, an optional decision 506 may determine if the reschedule time (the time that either scheduled modem processor call is shifted earlier or later in time) is less than an accuracy of the scheduled modem processor call(s) being rescheduled. For instance, if a first scheduled modem processor call is associated with an accuracy of 10 seconds, but is rescheduled to occur 20 seconds earlier than originally scheduled, then the decision 506 would result in a negative answer. When the decision 506 results in a negative answer, the method 500 continues to a modem processor transmit operation 510 where the modem processor call can be transmitted from a modem processor (e.g., 940, 942) without being rescheduled.

On the other hand, if the rescheduling time is less than an accuracy associated with the modem processor call, then the decision 506 results in an affirmative answer and the method 500 moves to the reschedule operation 508 where the reschedule time(s) is applied to one or both of the next two scheduled modem processor calls such that they occur at the same time. The rescheduled next two scheduled modem processor calls can reach the modem processor, which transmits data packets corresponding to each of the calls in a modem processor transmit operation 510. The method 500 can then restart for a next two scheduled modem processor calls.

Although the method 500 has been described in terms of just two modem processor calls, one of skill in the art will recognize that the method 500 is applicable to three or more modem processor calls. Further, the method 500 can operate at a variety of times such as when an application schedules or deschedules a timer or when a timer of any application expires.

In some embodiments, rescheduling may not be desirable for certain applications, despite the power savings potential, since those applications are particularly susceptible to degradation of user experience when rescheduled (e.g., a VOIP application). For these applications, application developers can avoid invoking the herein disclosed library functions (e.g., function(s) of library 908). As such, these sensitive applications will be scheduled as per methods well-known in the art rather than via the method 500.

In an embodiment, the method 500 can be implemented in software. For instance, the method 500 can be embodied in an a library (e.g., library 908) generated or modified via an API, the operating system, services, or a shared library or other non-core library. In one embodiment, the method 500 can operate on timers in a link list. The identification operation 502 can look at a link list, identify the next scheduled timer to fire and identify other timers set to expire shortly thereafter. If the accuracy of any of these timers allows (decision 506), a reschedule time can be determined (operation 504) for one or more of these timers such that they can be rescheduled in the reschedule operation 508 to fire at the same time. Link lists can be created by an OS in one embodiment, and the OS can add timers to the link list when an application makes a call to transmit data packets.

Figure 6:
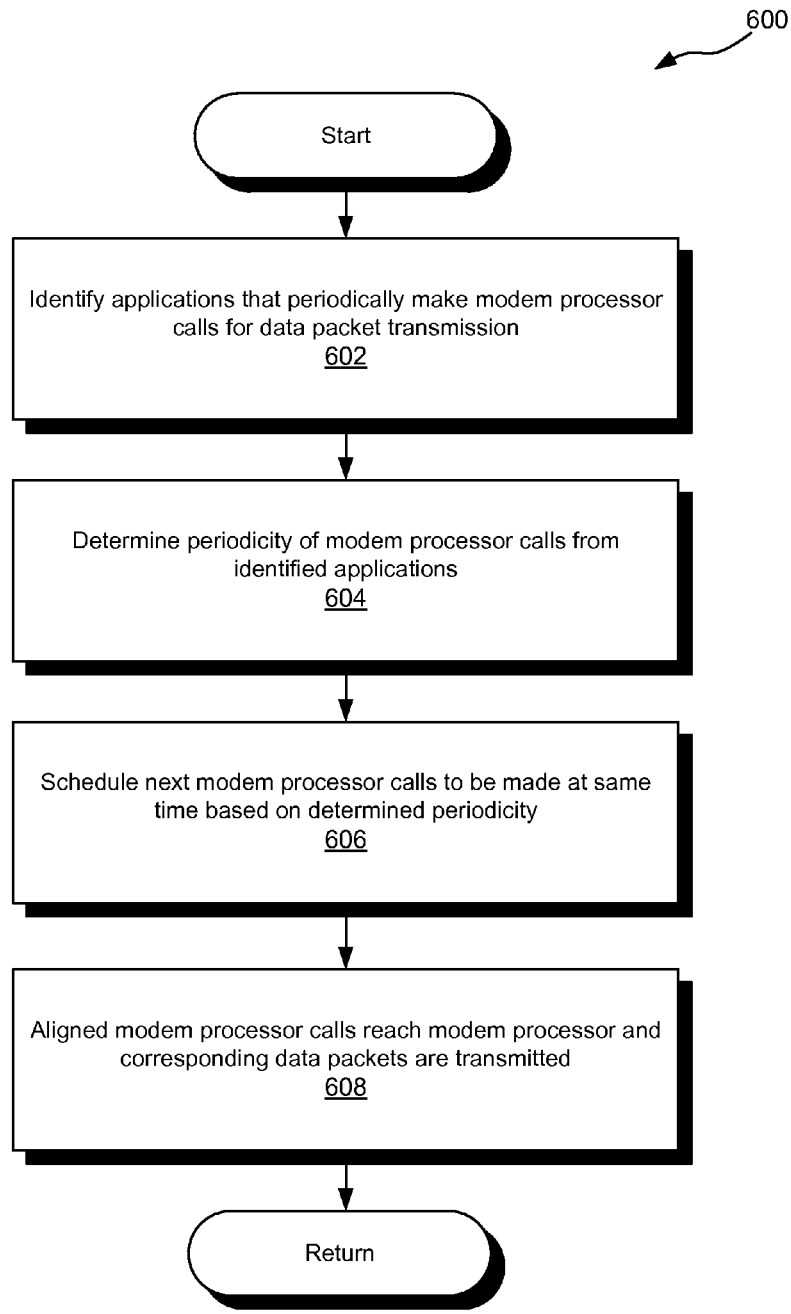
FIG. 6 illustrates an embodiment of a method for aligning periodic data packet transmissions at the network protocol stack.

FIG. 6 illustrates an embodiment of a method 600 for aligning periodic data packet transmissions at the network protocol stack. The method 600 can include identifying applications that periodically make modem processor calls to transmit data packets in an identification operation 602. Then, in a determine periodicity operation 604, a periodicity of the modem processor calls from the applications identified in the identification operation 602 can be determined. A scheduling operation 606 then schedules the modem processor calls for receipt by a modem processor (e.g., 304, 306, 308, 440, 442) at the same time based on the periodicities determined in determine periodicity operation 604. The aligned modem processor calls then reach the modem processor in operation 608 and data packets corresponding to the received modem processor calls are transmitted by the modem processor.

In this way the modem processor can be awakened by multiple data packets simultaneously thus shortening the amount of time that a fixed delay period of the modem processor keeps the modem processor in an active rather than dormant state (recall FIG. 2). These operations 602, 604, 606, 608 can repeat in a looping fashion such that the operations 602, 604, 606, 608 repeat for subsequent and new modem processor calls. For instance, the periodicity that is determined in the determine periodicity operation 604 may change over time for a given application since a greater number of data points can provide a more accurate average estimate of the periodicity.

The identification operation 602 can identify periodic data transmissions at some layer of the software stack prior to the data packets reaching the modem processor and awakening the modem processor if it is in a dormant state. In one embodiment, the identification operation 602 can involve generating a timestamp associated with every modem processor call. Periodicity can be identified by comparing consecutive timestamps associated with modem processor calls for a given application or by placing the timestamps into a table and looking for periodicity amongst the modem processor calls from a given application. In particular, a destination identifier (e.g., IP address and port number of data packet destination) can be used to identify modem processor calls generated by the same application. In one embodiment, the identification operation 602 can be implemented in a data link layer (e.g., 426), in a scheduling module (e.g., 428), or in one or more network drivers (e.g., 430, 432), to name a few non-limiting examples.

In some embodiments periodicity need not be perfect, but can have a margin of error. For instance, where an application is scheduled to transmit data packets at the times 5:00:01, 5:00:32, 5:00:59, 5:01:30, and 5:01:58, the data packets can be considered periodic within a margin of +/− 3 seconds. However, if the acceptable margin is only 1 second, then the identification operation 602 cannot identify this pattern as periodic. While +/− 1 second and 3 seconds are two exemplary margins of error, many other margins of error can also be implemented. Where a time between modem processor calls is periodic but varied within the acceptable margin of error, an average difference between modem processor calls can be used to determine the periodicity.

In one instance the determine periodicity operation 604 can look at the timestamps from the identification operation 602 and calculate a periodicity for each application identified in the identification operation 602. The periodicity can be used to estimate an arrival of a next modem processor call from an application. In this way, the schedule operation 606 can predict when modem processor calls are expected to be made and accordingly delay certain of the modem processor calls in order that two or more occur simultaneously.

The delay that the schedule operation 606 employs can be referred to as a delay time. Once two or more instances of periodic modem processor calls are aligned, some or all subsequent modem processor calls generated by the same two or more applications will also coextensively awaken the modem processor.

In some embodiments the identify, determine, and schedule operations 602, 604, 606, respectively, can be implemented in a scheduling module such as scheduling module 330 or 428.

Figure 7:
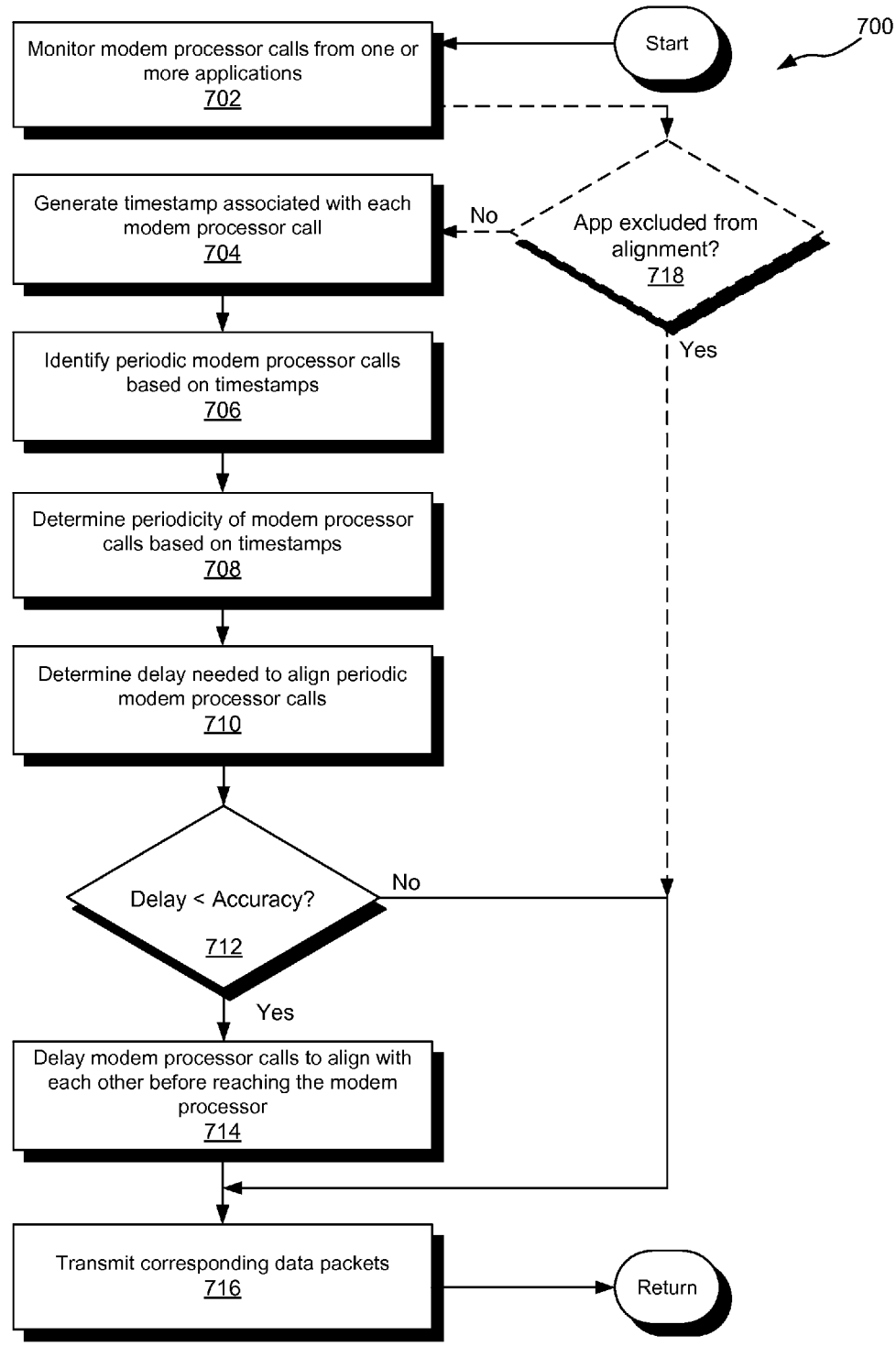
FIG. 7 illustrates yet another embodiment of a method for aligning periodic modem processor calls at the network protocol stack.

FIG. 7 illustrates yet another embodiment of a method 700 for aligning periodic modem processor calls at the network protocol stack. The method 700 begins by monitoring modem processor calls from applications for transmission of data packets in an attempt to identify periodic data packet transmissions. This monitoring can be carried out in a monitor operation 702 by, for instance, a scheduling module such as 330, 428. In a generate timestamp operation 704, a timestamp is generated for each modem processor call, even different calls from the same application. In an identify periodic modem processor calls operation 706, the timestamps can be analyzed to identify applications that make periodic modem processor calls. A determine periodicity operation 708 can then analyze the timestamps to determine a periodicity of the periodic modem processor calls.

A delay time can then be determined in determine delay operation 710, where a delay time is determined relative to each periodic modem processor call. The delay times correspond to a time that a given modem processor call is to be delayed in order to reach the modem processor at the same time as at least one other modem processor call. This delay time can then be compared to an accuracy assigned to each modem processor call in a decision 712. If the delay time is less than the accuracy for a given modem processor call, then the modem processor call can be delayed according to delay operation 714 so that the modem processor call aligns with at least one other modem processor call. If the delay time is not less than the accuracy, then the modem processor call occurs without delay per its original scheduling and its corresponding data packets are transmitted in a transmit operation 716.

Various of the operations in the method 700 can be implemented in a data link layer (e.g., 426), in a scheduling module (e.g., 428), or in one or more network drivers (e.g., 430, 432), to name a few non-limiting examples.

In one embodiment, after the monitor operation 702, the method 700 may turn to an optional decision 718 that determines whether an application is to be excluded from alignment. Applications that would be excluded include those where any delay in modem processor calls could degrade a user experience (e.g., VOIP). If the application identified as generating periodic modem processor calls is such an application, then the method 700 skips operations 704, 706, 708, 710, 714, and decision 712 and instead allows the calls to reach the modem processor without delay and the corresponding data packets to be transmitted in transmit operation 716. If the application is not such an application, then the decision 718 directs the method 700 to the generate timestamp operation 704 and the method 700 continues as described earlier. In some embodiments, applications can be identified by a port number associated with each modem processor call.

Figure 8:
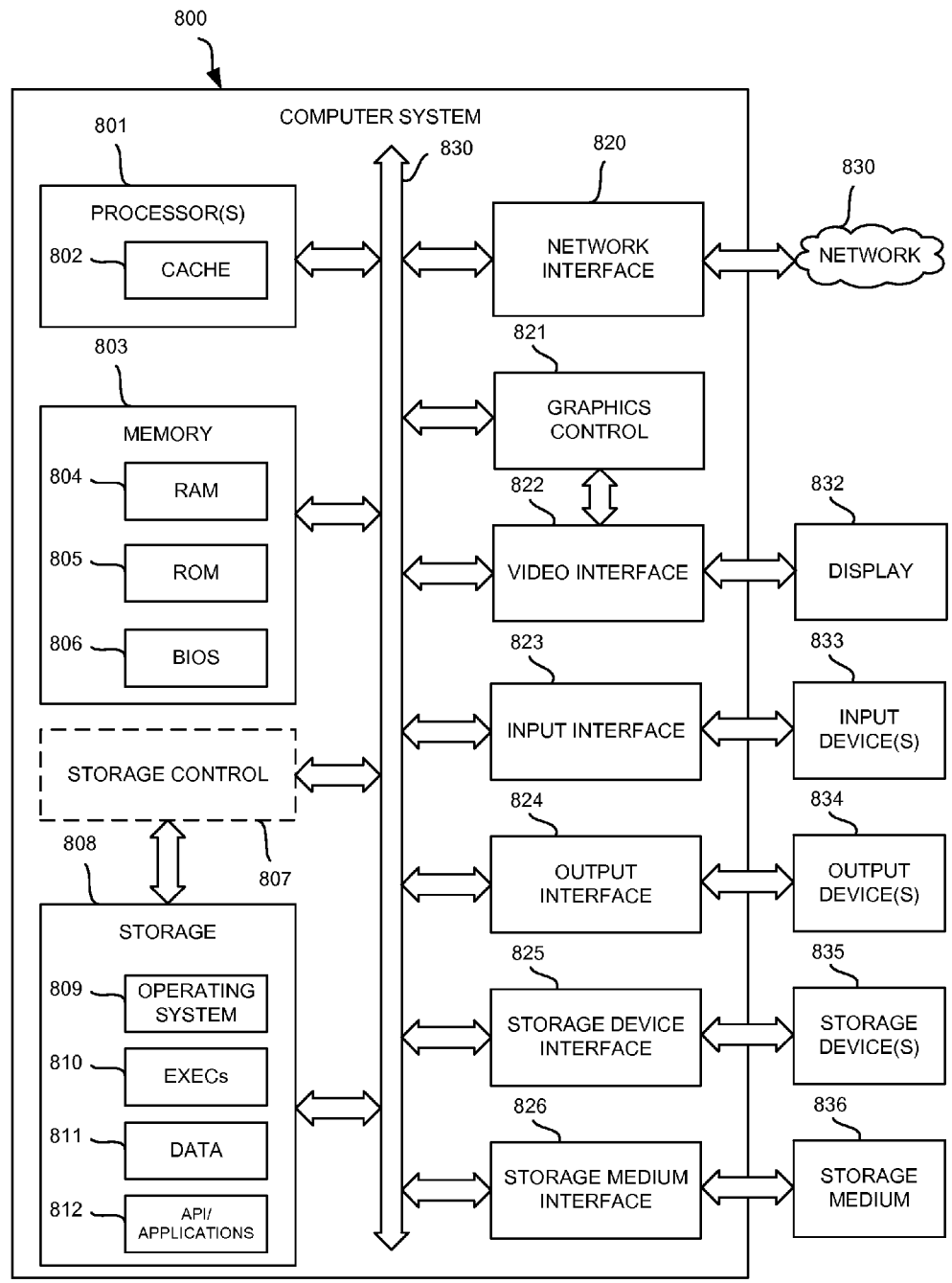
FIG. 8 shows a diagrammatic representation of one embodiment of a machine in the exemplary form of a computer system within which a set of instructions can execute for causing a device to perform or execute any one or more of the aspects and/or methodologies of the present disclosure.

The systems and methods described herein can be implemented in a machine such as a computer system in addition to the specific physical devices described herein. FIG. 8 shows a diagrammatic representation of one embodiment of a machine in the exemplary form of a computer system 800 within which a set of instructions can execute for causing a device to perform or execute any one or more of the aspects and/or methodologies of the present disclosure. The components in FIG. 8 are examples only and do not limit the scope of use or functionality of any hardware, software, embedded logic component, or a combination of two or more such components implementing particular embodiments.

Computer system 800 may include a processor 801, a memory 803, and a storage 808 that communicate with each other, and with other components, via a bus 840. The bus 840 may also link a display 832, one or more input devices 833 (which may, for example, include a keypad, a keyboard, a mouse, a stylus, a touchscreen, voice command module, etc.), one or more output devices 834, one or more storage devices 835, and various tangible storage media 836. All of these elements may interface directly or via one or more interfaces or adaptors to the bus 840. For instance, the various tangible storage media 836 can interface with the bus 840 via storage medium interface 826. Computer system 800 may have any suitable physical form, including but not limited to one or more integrated circuits (ICs), printed circuit boards (PCBs), mobile handheld devices (such as mobile telephones, smartphones, tablet computers, or PDAs), laptop or notebook computers, ultrabooks, distributed computer systems, computing grids, or servers.

Processor(s) 801 (or central processing unit(s) (CPU(s))) optionally contains a cache memory unit 802 for temporary local storage of instructions, data, or computer addresses. Processor(s) 801 are configured to assist in execution of computer readable instructions. For instance, the processor(s) 801 can be configured to execute computer readable instructions for carrying out the methods described and illustrated with reference to FIGS. 6-8. In some embodiments, the processor (s) 801 can be embodied by the scheduling module 330, 428. Computer system 800 may provide functionality as a result of the processor(s) 801 executing software embodied in one or more tangible computer-readable storage media, such as memory 803, storage 808, storage devices 835, and/or storage medium 836. The computer-readable media may store software that implements particular embodiments, and processor (s) 801 may execute the software. Memory 803 may read the software from one or more other computer-readable media (such as mass storage device(s) 835, 836) or from one or more other sources through a suitable interface, such as network interface 820. The software may cause processor(s) 801 to carry out one or more processes or one or more steps of one or more processes described or illustrated herein (e.g., methods 500, 600, 700). Carrying out such processes or steps may include defining data structures stored in memory 803 and modifying the data structures as directed by the software. For instance, the data structures stored in memory 803 may include identifications of applications associated with periodic data streams, or they may identify the periods of periodic data packets. The data structures stored in the memory 803 may also define a period to which various data packet streams are to be aligned.

The memory 803 may include various components (e.g., machine readable media) including, but not limited to, a random access memory component (e.g., RAM 804) (e.g., a static RAM "SRAM", a dynamic RAM "DRAM, etc.), a read-only component (e.g., ROM 805), and any combinations thereof. ROM 805 may act to communicate data and instructions unidirectionally to processor(s) 801, and RAM 804 may act to communicate data and instructions bidirectionally with processor(s) 801. ROM 805 and RAM 804 may include any suitable tangible computer-readable media described below. In one example, a basic input/output system 806 (BIOS), including basic routines that help to transfer information between elements within computer system 800, such as during start-up, may be stored in the memory 803.

Fixed storage 808 is connected bidirectionally to processor (s) 801, optionally through storage control unit 807. Fixed storage 808 provides additional data storage capacity and may also include any suitable tangible computer-readable media described herein. Storage 808 may be used to store operating system 809, EXECs 810 (executables) (e.g., 320, 406, 906), data 811, library (e.g., 908) and applications 812 (e.g., 320, 406, 906), and the like. For instance, the storage 808 may store one or more APIs 812 enabling application developers to configure their applications to make modem processor calls that are aligned with those of other applications. Often, although not always, storage 808 is a secondary storage medium (such as a hard disk) that is slower than primary storage (e.g., memory 803). Storage 808 can also include an optical disk drive, a solid-state memory device (e.g., flash-based systems), or a combination of any of the above. Information in storage 808 may, in appropriate cases, be incorporated as virtual memory in memory 803.

In one example, storage device(s) 835 may be removably interfaced with computer system 800 (e.g., via an external port connector (not shown)) via a storage device interface 825. Particularly, storage device(s) 835 and an associated machine-readable medium may provide nonvolatile and/or volatile storage of machine-readable instructions, data structures, program modules, and/or other data for the computer system 800. In one example, software may reside, completely or partially, within a machine-readable medium on storage device(s) 835. In another example, software may reside, completely or partially, within processor(s) 801.

Bus 840 connects a wide variety of subsystems. Herein, reference to a bus may encompass one or more digital signal lines serving a common function, where appropriate. Bus 840 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 800 may also include an input device 833. In one example, a user of computer system 800 may enter commands and/or other information into computer system 800 via input device(s) 833. For instance, the input device (s) 833 may enable a user to enter one or more Internet search terms or a URL. Examples of an input device(s) 833 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 833 may be interfaced to bus 840 via any of a variety of input interfaces 823 (e.g., input interface 823) including, but not limited to, serial, parallel, game port, USB, FIREWIRE, THUNDERBOLT, or any combination of the above.

In particular embodiments, when computer system 800 is connected to network 830, computer system 800 may communicate with other devices, specifically mobile devices, remote servers, and enterprise systems, connected to network 830. The network 830 can include the Internet or a combination of a cellular network and the Internet, to name two examples. Communications to and from computer system 800 may be sent through network interface 820. For example, network interface 820 may receive incoming communications (such as requests or responses from other devices) in the form of one or more data packets (such as Internet Protocol (IP) packets) from network 830, and computer system 800 may store the incoming communications in memory 803 for processing. The network interface 820 can operate on one of a variety of protocols such as third generation (3G) protocols such as Universal Mobile Telecommunication System (UMTS) or Evolution-Data Optimized (EVDO). Other protocols include fourth generation (4G) protocols such as high-speed packet access plus (HSPA+) or Long Term Evolution (LTE). Other protocols can also be used, especially as other 4G protocols and future protocols evolve. In one embodiment, the network interface 820 can be embodied by the one or more network drivers 430, 432. Computer system 800 may similarly store outgoing communications (such as requests or responses to other devices) in the form of one or more data packets in memory 803 and communicated to network 830 from network interface 820. Processor(s) 801 may access these communication packets stored in memory 803 for processing and delay, where a delay is appropriate to align one or more periodic data packets.

Examples of the network interface 820 include, but are not limited to, a network interface card, a modem, a modem processor (e.g., 304, 306, 308, 440, 442, 940, 942), network drivers (e.g., 430, 432, 930, 932), and any combination thereof. Examples of a network 830 (or network segment) include, but are not limited to, a wide area network (WAN) (e.g., the Internet, an enterprise network), a local area network (LAN) (e.g., a network associated with an office, a building, a campus or other relatively small geographic space), a telephone or cellular network, a direct connection between two computing devices, and any combinations thereof. A network, such as network 830, may employ a wired and/or a wireless mode of communication. In general, any network topology may be used.

Information and data can be displayed through a display 832. Examples of a display 832 include, but are not limited to, a liquid crystal display (LCD), an organic liquid crystal display (OLED), a cathode ray tube (CRT), a plasma display, and any combinations thereof. The display 832 can interface to the processor(s) 801, memory 803, and fixed storage 808, as well as other devices, such as input device(s) 833, via the bus 840. The display 832 is linked to the bus 840 via a video interface 822, and transport of data between the display 832 and the bus 840 can be controlled via the graphics control 821.

In addition to a display 832, computer system 800 may include one or more other peripheral output devices 834 including, but not limited to, an audio speaker, a printer, and any combinations thereof. Such peripheral output devices may be connected to the bus 840 via an output interface 824. Examples of an output interface 824 include, but are not limited to, a serial port, a parallel connection, a USB port, a FIREWIRE port, a THUNDERBOLT port, and any combinations thereof.

In addition or as an alternative, computer system 800 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A communication device comprising:
   a modem processor configured to receive modem processor calls and in response transmit corresponding data packets to another device, the modem processor further configured to remain active for a fixed delay after each modem processor call;
   an application processor comprising:
      a first application configured to make a first periodic modem processor call to the modem processor, the first periodic modem processor call configured to cause a first periodic data transmission to another device;
      a second application configured to make a second periodic modem processor call to the modem processor subsequent to the first modem processor call, the second periodic modem processor call configured to cause a second periodic data transmission to another device,
      the first and second periodic modem processor calls initially scheduled to occur at different and non-overlapping times; and
      a scheduling module configured to schedule a start of the first periodic modem processor call including a delay such that it aligns with the second modem processor call and increases a length of uninterrupted dormancy state that follows the second periodic modem processor call, the length being greater than if the delay were not scheduled.

2. The communication device of claim 1, wherein the scheduling module is part of a network protocol stack of the application processor.

3. The communication device of claim 2, wherein the scheduling module is part of a data link layer of the network protocol stack.

4. The communication device of claim 3, wherein the scheduling module is part of a network driver of the data link layer.

5. The communication device of claim 1, wherein the scheduling module identifies the first and second applications as generating periodic modem processor calls.

6. The communication device of claim 5, wherein the scheduling module determines a periodicity of the first and second periodic modem processor calls from the first and second applications based on periodic modem processor calls made prior to either of the first or second periodic modem processor calls.

7. The communication device of claim 1, wherein the scheduling module associates an accuracy with the first application.

8. The communication device of claim 7, wherein if a length of the proposed delay is greater than the accuracy of the first application, then the scheduling module does not delay the first modem processor call.

9. A communication device comprising:
   a means for receiving periodic modem processor calls requesting transmission of data other than telephone calls;
   a modem processor configured for transmitting corresponding outgoing data packets to another device;
   a means for making at least a first periodic modem processor call to the modem processor;
   a means for making at least a second periodic modem processor call to the modem processor subsequent to the first modem processor call; and
   a means for scheduling a start of one of the first and second periodic modem processor calls including a delay, to align the first and second periodic modem processor calls such that they reach the modem processor closer in time than if the delay did not occur, and increasing a length of a dormancy state that the modem processor enters, the length being greater than if the delay did not occur.

10. The communication device of claim 9, wherein the means for making at least a second periodic modem processor call is configured to cause the first periodic modem processor call to occur later than scheduled.

11. The communication device of claim 10, wherein the means for making at least a second periodic modem processor call is configured to cause the second periodic modem processor call to occur earlier than scheduled.

12. The communication device of claim 9, wherein the means for making at least a second periodic modem processor call is configured to cause the second periodic modem processor call to occur earlier than scheduled.

13. The communication device of claim 9, wherein the means for delaying one of the first and second periodic modem processor calls is part of a network protocol stack of an application processor.

14. The communication device of claim 9, wherein the means for delaying one of the first and second periodic modem processor calls identifies first and second applications as generating periodic modem processor calls.

15. The communication device of claim 14, wherein the means for delaying one of the first and second periodic modem processor calls determines a periodicity of modem processor calls from the first and second applications based on modem processor calls made prior to either of the first or second periodic modem processor calls.

16. A method of operating a communication device comprising:
   identifying applications that periodically make modem processor calls to a modem processor as identified applications, the modem processor remaining in an active state for a fixed delay after each modem processor call;
   determining periodicities of modem processor calls made by the identified applications;
   scheduling a start of at least a next modem processor call from a first of the identified applications to occur closer in time to a start of a next modem processor call from a second of the identified applications to occur based on the determined periodicities, wherein the next modem processor call would not otherwise occur at the same time; and as a result,
   increasing a length of a dormancy state of the modem processor; and
   transmitting data packets corresponding to the next two modem processor calls at substantially the same time.

17. The method of claim 16, wherein the scheduling further comprises delaying at least one of the next two of the modem processor calls.

18. The method of claim 16, further comprising: identifying ones of the identified applications as listed for exclusion from alignment, and for these ones of the identified applications, transmitting data packets corresponding to modem processor calls from the identified ones of the identified applications according to their originally-scheduled transmission times.

19. The method of claim 16, wherein the periodicities are determined from timestamps associated with prior modem processor calls of the identified applications.

20. A non-transitory, tangible computer readable storage medium, encoded with processor readable instructions to perform a method for operating a communication device, the method comprising:
- receiving modem processor calls at a modem processor, the modem processor remaining in an active state for a fixed delay after each receipt of a modem processor call;
- transmitting outgoing data packets, for data rather than telephone transmissions, corresponding to the modem processor calls to another device;
- making a first string of requests to the modem processor, the first string of requests having a first periodicity, the first string of requests being for the modem processor to transmit data associated with each request;
- making a second string of requests to the modem processor, the second string of requests having a second periodicity, the second string of requests being for the modem processor to transmit data associated with each request; and
- adjusting a phase of the first or second string of requests such that the requests from the first and second strings of requests become more closely aligned, and as a result,
- increasing a length of a dormancy state of the modem processor.

21. The non-transitory, tangible computer readable storage medium of claim 20, wherein the adjusting further comprises delaying the first string of requests.

22. The non-transitory, tangible computer readable storage medium of claim 20, wherein the adjusting includes determining the first periodicity of the first string of requests and the second periodicity of the second string of requests.

23. The non-transitory, tangible computer readable storage medium of claim 22, wherein the first and second periodicities are determined from timestamps associated with prior modem processor calls.

* * * * *